Figure 1:
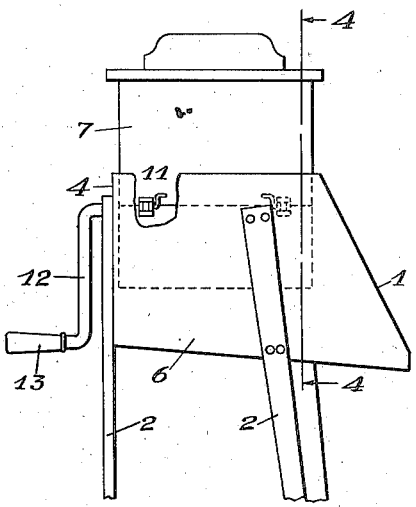

Aug. 9, 1938.  M. SANTAMARIA ET AL  2,126,045

FRUIT JUICE EXPRESSING DEVICE

Filed Sept. 19, 1936

INVENTORS
Michelino Santamaria
and Emedio Santamaria
BY Nelson A Hallauer
their ATTORNEY Patented Aug. 9, 1938

2,126,045

UNITED STATES PATENT OFFICE 2,126,045

FRUIT JUICE EXPRESSING DEVICE

Michelino Santamaria and Emedio Santamaria, Rochester, N. Y.

Application September 19, 1936, Serial No. 101,618

1 Claim. (Cl. 146—174)

This invention relates to improvements in fruit juice expressing devices and has for its principal object the provision of a simple and inexpensive apparatus of this kind, adapted to crush or macerate fruit and express juice therefrom, rapidly and without undue effort on the part of the operator.

Another object of the invention is to provide a machine of this kind in which the fruit is subjected to both cutting and crushing operations, means being provided for separating the seeds and solid portions of the fruit from the juice.

More specifically, the object of the invention is to provide a hopper for the fruit having a porous or perforated bottom in which is mounted a rotor adapted to cut the fruit and crush it against the side of the hopper, and the perforated bottom comprising a detachable screen, so that one of larger or smaller mesh may be substituted therefor.

To these and other ends, the invention consists of certain novel construction and arrangement of parts, hereinafter fully described and illustrated in the accompanying drawing forming a part of this specification, the novel features being particularly pointed out in the claim at the end of this specification.

Figure 2:
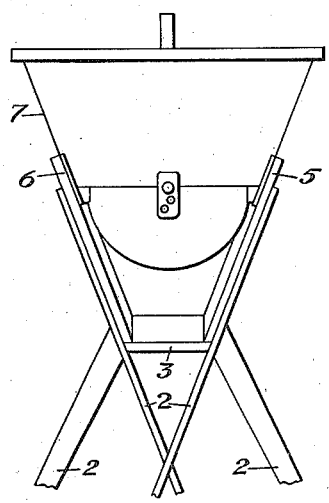
Figure 3:
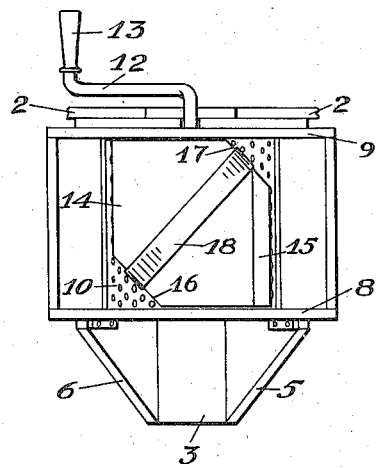
Figure 4:
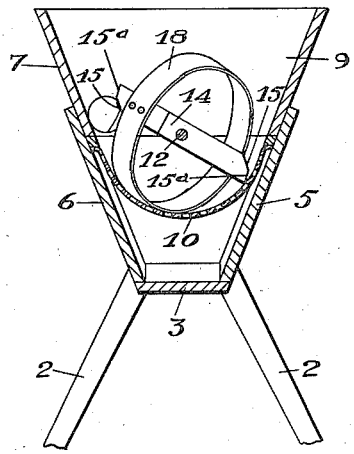

In the drawing:

Figure 1 is a side elevation of a juice expressing device constructed according to one possible embodiment of the invention, Figure 2 is a front elevation of the same, Figure 3 is a plan view, and Figure 4 is a vertical section on line 4—4 of Fig. 1.

Referring more particularly to the drawing, the illustrated apparatus comprises a delivery trough 1 or chute arranged on any suitable support, such as the legs 2. The trough is so arranged that its bottom member 3 is inclined forwardly and downwardly, and is provided with an upwardly projecting rear wall 4 and side walls 5 and 6 which may be inclined inwardly at their lower ends as clearly shown in the drawing. Detachably supported on the trough 1, in any suitable manner is a hopper 7 of any convenient form open at its top and having vertical front and rear walls 8 and 9. The bottom portion of the hopper may be formed of a porous metal screen 10 bent to a cylindrical form as shown. The metal screen is preferably detachably secured to the side walls of the hopper by the latches 11 or other suitable means.

A rotor is revolubly mounted in the front and rear walls of the hopper and comprises a shaft 12 provided at one end with a suitable crank 13 by which it may be manually rotated. It will be understood that a pulley may be substituted for the crank, if desired, to operate the machine with power. Secured to the shaft to rotate therewith and arranged within the hopper is a ladle or crushing and agitating member in the form of a substantially rectangular or square block 14, of a size and shape to have its ends move closely adjacent the sides of the hopper and so that its ends move closely adjacent but free of the metal screen when rotated. The front sides of the ends may be cut away to form the inclined edges or beveled portions 15 and 15a inclined relatively to each other and to the faces of the block, so that when the block is rotated material in the hopper is directed against the sides of the hopper and crushed or macerated between said beveled portions and the sides of the hopper, further movement of the block carries the crushed material forward to the screen where it is further macerated and the juices expressed therefrom, together with portions of the soft pulp pressed through the screen are caught in the trough and delivered from its front end.

The block 14 has a pair of diagonally opposite corners cut away, as at 16 and 17, to form a bypass so that the fruit or other material in the hopper may escape therethrough, which might otherwise clog the rotor and cause injury to the parts. Mounted on the block, is a circular cutter 18 having its diameter arranged diagonally of the block and on the cut-away corners 16 and 17 where it is secured to the block to rotate therewith by means of screws or similar devices. The cutter is of a diameter to move closely adjacent but free of the porous bottom of the hopper when the rotor is turned.

In operation, the fruit or other material to be crushed and expressed is poured into the hopper and the rotor turned. The cutter 18 cuts the material, which is quite important when juices are to be expressed from large or relatively hard material such as apples or tomatoes. The fruit is caught between the beveled portions 15 and 15a of the block and the side of the hopper and screen and the juices flow through the screen into the delivery chute. The screen 10 may be made of slightly resilient sheet material, so that it may flex away from the block to prevent small solid portions, such as seeds, which cannot pass through the screen, from preventing the free rotation of the block in a forward direction. When small relatively soft fruits are employed, such as grapes, berries and the like, the cutter may be dispensed with, since the block 14 alone, is sufficient to crush and express the juice from such material, due to the combined action of its beveled edges 15 and 15a.

In the past, the apparatus employed for crushing fruits such as tomatoes, grapes, cherries and the like, and expressing the juice therefrom, have been more or less expensive, cumbersome and unsanitary, the present invention provides a device of this kind, which is inexpensive to make, occupies but little space, is not liable to get out of order, and in which fruit may be crushed and its juices extracted in a single operation.

Although only one embodiment of the invention is shown and described herein, it will be understood that this application is intended to cover such changes or modifications, as come within the spirit of the invention or scope of the following claim.

Having described our invention, what we claim and desire to secure by Letters Patent is:

A juice expressing device, comprising a hopper, having straining means, a delivery chute for receiving juices from said straining means, and a rotor in said hopper comprising a substantially rectangular block having diagonally opposite corners cut away to provide a by-pass for material in the hopper and a substantially circular cutter arranged diagonally on the block and secured to said cut-away corners.

MICHELINO SANTAMARIA.
EMEDIO SANTAMARIA.